United States Patent
Kuehl

[11] Patent Number: 6,006,436
[45] Date of Patent: Dec. 28, 1999

[54] SHEET LENGTH COUNTER FOR PLOTTER

[75] Inventor: Wesley C. Kuehl, Greenwood, Wis.

[73] Assignee: Owen Manufacturing Inc., Owen, Wis.

[21] Appl. No.: 08/706,219

[22] Filed: Aug. 30, 1996

Related U.S. Application Data

[63] Continuation-in-part of application No. 08/615,854, Mar. 12, 1996.

[51] Int. Cl.⁶ .................................................... B43L 13/00
[52] U.S. Cl. ............................. 33/18.1; 33/32.4; 33/32.6; 33/773
[58] Field of Search ........................... 33/18.1, 1 N, 1 PJ, 33/32.4, 32.5, 32.6, 32.7, 706, 707, 708, 709, 710, 711, 712, 732, 733, 734, 735, 736, 739, 743, 746, 753, 772, 773, 775

[56] References Cited

U.S. PATENT DOCUMENTS

| | | | |
|---|---|---|---|
| 3,739,276 | 6/1973 | Dornberger | 33/732 |
| 4,970,802 | 11/1990 | Nosek | 33/711 |
| 5,182,861 | 2/1993 | Suzuki et al. | 33/32.4 |
| 5,218,769 | 6/1993 | Tranchon | 33/1 N |
| 5,577,330 | 11/1996 | Cheng | 33/772 |

Primary Examiner—Christopher W. Fulton
Attorney, Agent, or Firm—Shoemaker and Mattare, Ltd.

[57] ABSTRACT

An engineering drawing plotter includes a feed roller for moving paper lengthwise bidirectionally with respect to one or more plotting pens. A counter installed on the plotter includes a pulse switch for measuring absolute lengthwise paper displacement, a direction transducer for determining paper movement direction, and a counter responsive to the measuring device and direction indicating device, for determining and displaying cumulative net paper displacement.

10 Claims, 2 Drawing Sheets

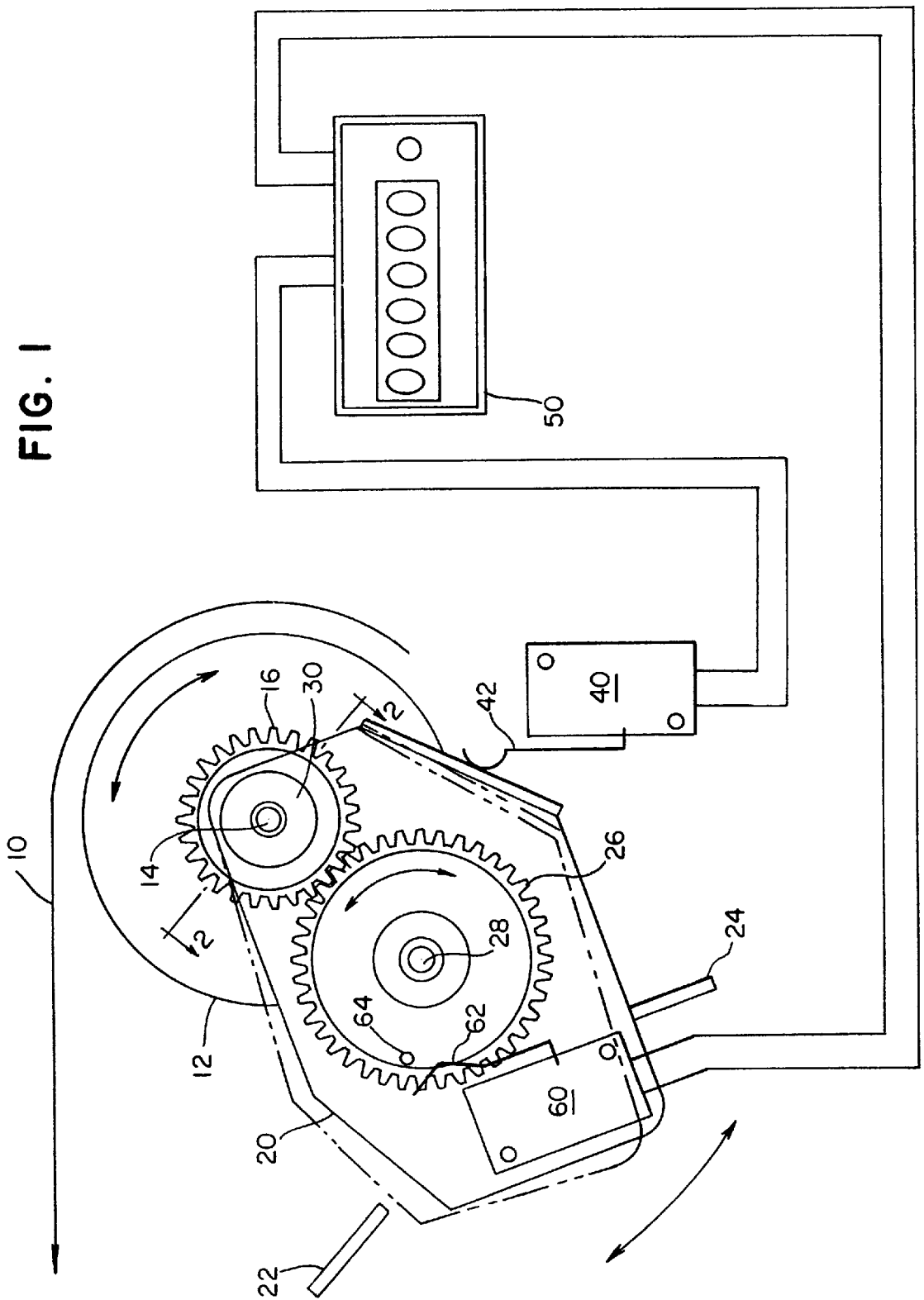

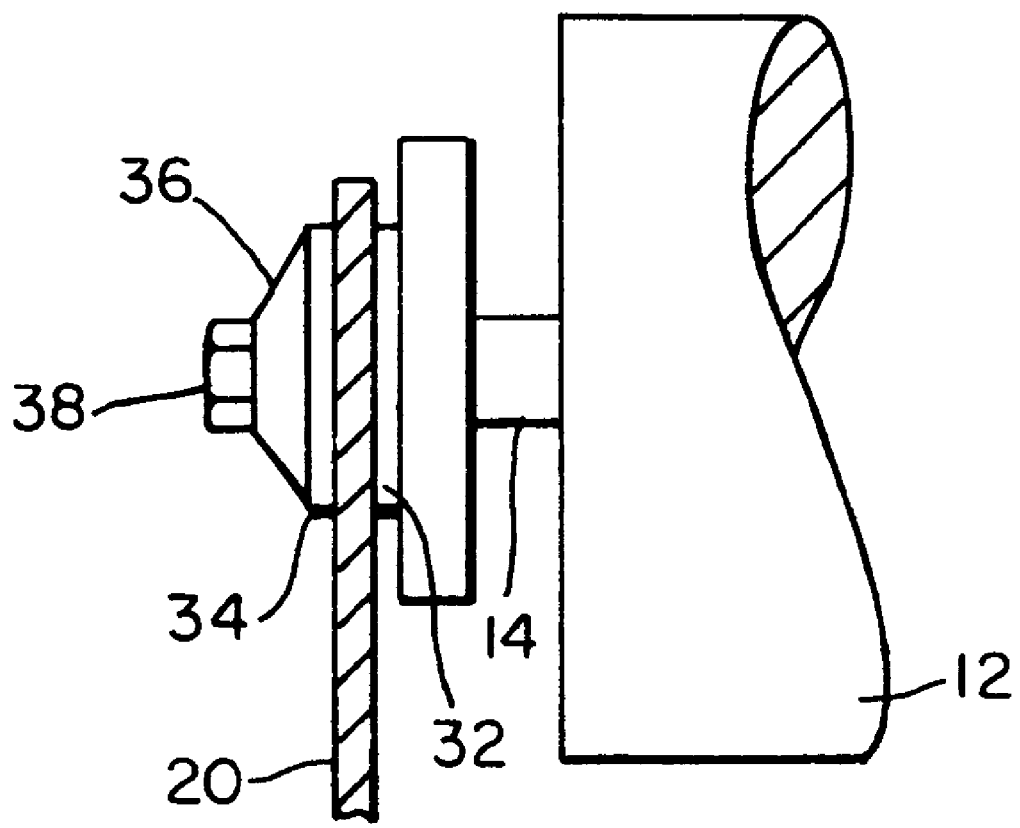

SHEET LENGTH COUNTER FOR PLOTTER

This is a continuation-in-part of my copending patent application Ser. No. 08/615,854, filed Mar. 12, 1996.

BACKGROUND OF THE INVENTION

This invention relates to the art of measurement and more particularly to a sheet length counter for measuring paper usage in an engineering drawing plotter or other machine having bidirectional paper movement.

It is important to be able to monitor the usage of an engineering drawing plotter, so that media usage and machine wear and tear can be accurately evaluated. Plotters pose two difficult problems.

First, the drawing papers may be of different lengths. Just counting copies does not accurately measure use. Prior counters measured machine and media use in terms of copies made. They were accurate only when material of a known standard size was used.

Second, in plotters, the paper moves backwards and forward with respect to stationary pens. A simple pulse generator, which produces a series of pulses, one every unit of sheet length, cannot distinguish between the two directions. Use of such a counter without correction for paper direction would produce a grossly distorted paper usage report.

SUMMARY OF THE INVENTION

An object of the invention is to produce accurate measurements of machine and media usage in an engineering drawing plotter having bidirectional paper movement.

Another object of the invention is to provide a device which accumulates unmeasured fractions of a measurement unit, from copy to copy.

These and other objects are attained by a sheet length counter for an engineering drawing plotter having a feed roller for moving paper lengthwise bidirectionally with respect to one or more plotting pens. The counter includes means for measuring absolute lengthwise paper displacement, a direction transducer for determining paper movement direction, and means responsive to the measuring means and direction transducer, for producing an indication of net lengthwise paper movement.

BRIEF DESCRIPTION OF THE DRAWING

In the accompanying drawing,

FIG. 1 is a diagrammatic side elevation of portion of an engineering drawing plotter having a sheet length counter embodying the invention, and FIG. 2 is a sectional view taken on the line 2—2 in FIG. 1.

DESCRIPTION OF THE PREFERRED EMBODIMENT

The engineering drawing plotter illustrated has a paper path 10 defined in part by a transport roller 12. The transport roller has a shaft 14 to which a first gear 16 affixed.

Beyond the first gear, the shaft passes through a hole or bearing in a torque plate 20. The torque plate has rotational limits, defined by stops 22 and 24 which prevent it from rotating with the roller; however, it can oscillate back and forth between its limits as the rotational direction changes. The torque plate is shown in solid lines, representing its position during forward paper feed, and in phantom lines, representing the position during rearward paper feed.

A freewheeling second gear 26, meshing with the first, is mounted on a stub shaft 28 extending perpendicularly from the torque plate 20.

Whenever the roller rotates, a small drag torque is deliberately applied to the torque plate by a simple friction clutch 30. This clutch (see FIG. 2) comprises a thrust washer 32 between the gear 16 and the torque plate 20, another thrust washer 34 on the other side of the torque plate, a compression spring 36 bearing against the second thrust washer, and a retaining screw 38—threaded into the end of the shaft—for preloading the spring. The spring and thrust washers rotate with the roller and apply rotational friction to the plate, so that the plate turns with the roller until it strikes one of the stops. It remains in that stopped position until there is a change in paper direction. The position of the torque plate determines if the counter should count up or down.

A pulse-generating limit switch 40, whose arm 42 bears against an edge of the plate, provides an indication (off or on) of paper direction. The state of the switch is used as an input by an electronic counter 50, whose other data input is a series of pulses generated by the pulse switch. The counter maintains and indicates (digitally, for example) a cumulative paper displacement, incrementing the value by so much per pulse from the pulse generator when the direction transducer determines forward paper movement, and decrementing the value when the direction switch shows reverse movement. Inasmuch as the counter circuitry is a simple matter for a person skilled in this field, details of the counter are not shown.

The pulse generator 60 is a limit switch having an external arm 62 which extends into the path of a pin 64 that protrudes from the second gear 26 near its periphery. The switch arm shown has a "V" profile suitable for camming engagement with the pin, regardless of the direction of rotation of the second gear. Each time the pin depresses the arm sufficiently, the state of the switch changes (from open to closed, for example), then changes back once the pin has disengaged the arm. A pulsed signal thereby results.

While the pin described is presently preferred, other actuators could be used. In general, any protuberance from the second gear would be useful as a switch actuator. The pin 64 is one such protuberance.

Other types of pulse generators could be used. For example, the switch arm might engage the gear teeth directly, or an optical sensor might sense passage of the teeth or the pin and produce a corresponding pulsed output. Additionally, the pulse generator might be applied to the first gear (in which case the second gear could be omitted), or to any part of the machine which moves with the paper.

An advantage of the pulse generator described above is that it automatically accumulates fractional paper displacement, from sheet to sheet. That is, if the second gear moves a half turn after the last pulse, at the end of one piece of paper, it has to move only a half turn to produce a pulse when the next sheet is inserted. Also, fractional turns cancel one another out when the paper direction reverses.

It may be appropriate to add a paper presence sensor to this system, to prevent counting any roller motion when paper is not present. The paper sensor may be optical or mechanical. Suitable devices are well known.

It should also be understood that the details of the clutch are not particularly important, and the washer and spring arrangement described might be replaced by any of a number of other well known brakes or clutches for producing drag, including magnetic devices. It is also apparent that the clutch might be applied to the second gear, rather than the first, although this variation would cause the torque plate to rock in directions opposite to those described above.

Since the invention is subject to modifications and variations, it is intended that the foregoing description and the accompanying drawings shall be interpreted as only illustrative of the invention defined by the following claims.

I claim:

1. A sheet length counter for an engineering drawing plotter including means for moving paper lengthwise bidirectionally with respect to plotting pens, said moving means comprising a feed roller and means for turning the feed roller about its axis in either direction, said counter comprising means for measuring absolute lengthwise paper displacement, a direction transducer for determining paper movement direction, and a counter responsive to said measuring means and direction transducer, for determining and producing an indication of cumulative net lengthwise paper movement.

2. The invention of claim 1, wherein the measuring means comprises a device that produces a series of pulses, each representing a fixed amount of paper movement.

3. The invention of claim 2, wherein said device comprises a gear driven from the feed roller, at least one protuberance on the gear, and fixed pulse generating means activated by passage of said protuberance.

4. The invention of claim 3, wherein the pulse generating means is an electrical switch having an arm disposed in the path of the protuberance.

5. The invention of claim 1, wherein the direction transducer comprises a torque plate mounted for oscillation between limit positions, means for transferring torque from said roller to the torque plate, whereby the plate tends to one of said limit positions, depending on the direction of rotation of the roller, and means responsive to the position of the torque plate for producing a signal representative of the direction of rotation of said roller.

6. The invention of claim 5, wherein the means for transferring torque is a friction brake or clutch.

7. The invention of claim 5, wherein the means for transferring torque is a friction clutch mounted on the roller shaft.

8. The invention of claim 7, wherein the shaft passes through a hole or bearing in the torque plate.

9. The invention of claim 5, wherein the signal producing means is a limit switch actuated by movement of said torque plate between its limit positions.

10. The invention of claim 1, wherein the counter maintains and indicates a cumulative paper displacement value, incrementing the value by a fixed amount per pulse from the pulse generating means when the direction transducer indicates forward paper movement, and decrementing the value a like amount per pulse when the direction transducer indicates reverse paper movement.

* * * * *